US006171525B1

(12) United States Patent
Effer et al.

(10) Patent No.: US 6,171,525 B1
(45) Date of Patent: *Jan. 9, 2001

(54) PROCESS FOR THE PRODUCTION OF A PHOTOCHROMIC OBJECT

(75) Inventors: Erhard Effer, Pöcking; Manfred Melzig, Wessling; Herbert Zinner, Taufkirchen; Herbert Schuster, Emmering, all of (DE)

(73) Assignee: Optische Werke G. Rodenstock, Munich (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/005,754

(22) Filed: Jan. 12, 1998

Related U.S. Application Data

(63) Continuation of application No. 08/403,864, filed as application No. PCT/DE94/00871 on Jul. 27, 1994, now abandoned.

(30) Foreign Application Priority Data

Jul. 27, 1993 (DE) .................................................. 43 25 154

(51) Int. Cl.⁷ ....................................................... G02B 5/23
(52) U.S. Cl. ........................................... 252/586; 523/135
(58) Field of Search .................................... 252/582, 586; 523/135

(56) References Cited

U.S. PATENT DOCUMENTS

| | | | |
|---|---|---|---|
| 5,180,524 | * 1/1993 | Casilli et al. ........................ | 252/586 |
| 5,330,686 | * 7/1994 | Smith et al. ......................... | 252/586 |
| 5,391,327 | * 2/1995 | Ligas et al. ......................... | 252/586 |
| 5,621,017 | * 4/1997 | Kobayakawa et al. ............... | 252/586 |
| 5,833,885 | * 11/1998 | Rickwood et al. .................. | 252/586 |

* cited by examiner

Primary Examiner—Philip Tucker
(74) Attorney, Agent, or Firm—Antonelli, Terry, Stout & Kraus, LLP

(57) ABSTRACT

Disclosed is a process for the production of a photochromic object, composed of a polymer and containing at least one spirooxazin compound, having the following process steps:

an acrylate monomer or a methacrylate monomer, respectively a mixture of a multiple thereof is utilized as the polymerizable monomer, the photochromic dyes as well as a polymerization initiator are mixed in the polymerizable monomer, the mixture yielded thereby is placed in a casting mold, polymerized and hardened.

The present invention is distinguished by, in order to obtain a neutral gray, neutral brown or green photochromic tint of the polymerizable mixture, several photochromic dyes being added of which at least one is not a spirooxazin, and by the concentration of the spirooxazin compound(s) amounting to no more than 0.045 weight percent relative to the mass of the utilized monomer, and that of the polymerization initiator(s) amounting to more than 1 weight percent relative to the mass of the utilized monomer.

21 Claims, No Drawings

PROCESS FOR THE PRODUCTION OF A PHOTOCHROMIC OBJECT

This is a continuation application of U.S. Ser. No. 08/403,864, filed Apr. 10, 1995 now abandoned, which was a 371 of PCT/DE94/00871, filed Jul. 27, 1994.

DESCRIPTION

The present invention relates to a process for the production of a photochromic object composed of a polymer and containing at least one spirooxazin compound.

There are two fundamentally different methods of carrying out the processes of producing photochromic objects composed of a polymer:

In the one method, first a non-photochromically tinted object is produced which is subsequently photochromically tinted "on the surface" from one or several surfaces. An example of a process realizing this method is described in DE-A-35 16 568 to which is explicitly referred for the explanation of all the terms not dealt with in more detail herein.

In the other method, the photochromic dyes are mixed into the material from which the photochromic object is produced prior to its polymerization. Processes realizing this method are described in U.S. Pat. No. 4,342,668 or EP-B-O 227 337. The process described in the latter-mentioned printed publication is the generic-forming presumption for the formulation of the introductory part of the process herein.

An element of the present invention is that the following drawbacks of the processes in which the photochromic dye or dyes are mixed in the monomer prior to polymerization and, in particular, the process known from EP-B-O 227 337 were recognized:

Comparatively high concentrations are required even to achieve relatively little darkening: For instance, the process of EP-B-O 227 337 requires employing a dye with a concentration of 1.5% relative to the weight of the monomer in order to obtain darkenings of maximumly 0.47 usually 0.25 measured in maximum of absorption—valued according to V$\lambda$ even only 0.2.

Moreover, in the process known from EP-B-O 227 337, only a low hardening degree of the polymer is achieved. Although this yields the apparently desired darkening and lightening very quickly, the low hardening degree however results, in addition to mechanical problems, also in relatively short durability of the dyes as well as very high temperature dependency of the darkening.

Furthermore, the process known from EP-B-O 227 337 does not permit the production of photochromic objects and, in particular, of ophthalmic lenses having a neutral grey, neutral brown or green photochromic tint.

The object of the present invention is to improve a process for the production of a photochromic object composed of a polymer and containing at least one spirooxazin compound which is added to the monomer prior to polymerization in such a manner that an object having good mechanical properties is yielded in which the darkening and lightening lies within a physiologically acceptable range without the temperature dependency of these values becoming too great.

A solution to this object in accordance with the present invention is set forth herein. Further improvements of the present invention are the subject-matter of the dependent claims.

An element of the present invention is that in order to obtain a neutral grey, neutral brown or green photochromic tint, several dyes of which at least one is not a spirooxazin are added to the polymerizable mixture. As was recognized elsewhere, lenses that are neutral grey, neutral brown or green in a photochromically tinted state cannot be produced when using photochromic dyes solely of the spirooxazin class. Spironapthooxazins and heteroaromatic analog ones indicate red-violet to blue-green tints, spirobenzooxazins red to violet tints. To present knowledge there are no yellow to yellow-orange dyes absorbing in the blue spectral range among the spirooxazins.

For this reason, an element of the present invention is to add additional photochromic dyes of other classes:

All dyes hitherto known in tinting plastic materials can be utilized. Examples are, in addition to spirooxazins, photochromic pyrans and, in particular, spiropyrans, indolizins as well as fulgimides, respectively a mixture of these dyes can be employed.

A green tint can be obtained in the known manner by mixing one or several yellow or blue photochromic compounds or by employing photochromic compounds of long-wave length absorbing in the red spectral range.

Furthermore, according to the present invention the concentration of the spirooxazin compounds is no more than 0.045 weight percent relative to the mass of the utilized monomers and, therefore, lies below the range given in EPB-O 227 337 and very distinctly below the concentrations used in the embodiments described in EP-B-O 227 337. Undercutting the range of the aforementioned printed publication is a major economic advantage considering the high cost of photochromic dyes.

At the same time, the concentration of the polymerization initiator or initiators are distinctly raised above the range given in EP-B-O 227 337. This yields well-hardened photochromic objects and, in particular, photochromic ophthalmic lenses that meet all the mechanical requirements. Especially advantageous is that the darkening and lightening time is moved into a time range that is especially physiologically favorable according to available knowledge. Finally the temperature dependency of the darkening and the lightening is distinctly smaller than in the known photochromic objects.

Known initiators such as peroxyketals or alkylperoxyesters, which are substantially less reactive with photochromic dyes and in particular with spirooxazins and therefore are less destructive than the peroxydicarbonates such as CHPC (cyclohexylperoxydicarbonate) used in the state of the art, can be employed as initiators.

Particularly advantageous is if the concentration of the utilized polymerization initiator or initiators are up to 5 weight percent, preferably 1.5 to 2 weight percent.

Another disadvantage of the ophthalmic lenses known from the state of the art is that the equilibrium between the closed (colorless) and the open (colored) state is moved toward the open state yielding in many applications a disturbing pretinting.

A key element of the present invention is that it was recognized that this is a result of the quick hardening in the state of the art in which the polymerization initiator attacks the dyes. It is, therefore, particularly preferable if polymerization is carried out during a period of up to two days, which yields lenses having especially little pretinting.

The mechanical properties and the effect of the photochromic dyes are further improved due to the fact that polymerization is conducted according to a temperature program in the last stage of which the temperature is more than 110° C.

Also contributing thereto are the features set forth in the following:

The mixture of monomers, photochromic dyes and polymerization initiators is degased prior to polymerization so that an object is yielded which has no air bubbles or holes.

Especially advantageous is if the casting molds are made of a material which is impermeable to the excitation wavelengths of the utilized photochromic dyes. This ensures that the photochromic dyes are inserted in a "non-excited state" in the matrix of the polymers surrounding them so that there is no permanent pretinting.

Contributing to this as well are the features put forth in which the mixing process and the polymerization process occur under the influence of long-wave visible light due to which the utilized dyes are completely conveyed into the closed, i.e. colorless state.

Any acrylate monomers or methacrylate monomers may, of course, be employed as monomers for the invented process. Examples therefor are
2,2'-bis(4-(methacryloxy-ethoxy)phenyl)propane
2,2'-bis(4-methacryloxy-diethoxy)phenyl)propane
trimethylol propane trimethacrylate
ethylene glycol dimethacrylate
diethylene glycol dimethacrylate
triethylene glycol dimethacrylate
benzyl methacrylate
4-tertiary butyl cyclohexanol methacrylate
neopentyl glycol dimethacrylate
employed as monomers. This list of monomers is, of course, not complete in particular higher homologues may be employed.

The use of diacrylates and dimethacrylates having long hydrocarbon ether brigdes as comonomers results in drawbacks, e.g., too slow ligthening of the photochromic dyes. Lightening can be distinctly increased by adding special reagents, such as by way of example certain phosphor compounds.

The present invention has been generally described above; the aforedescribed process shall also be made more apparent using a preferred embodiment:

For the production of the photochromic casting resin mixture, the photochromic dye mixture is stirred at 20° C. under protection from light into 100 g of monomer (composed of 40% diethylene glycol diacrylate, 25% diethylene glycol dimethacrylate, 30% triethylene glycol diacrylate and 5% higher oligomers of the ethylene glycol diacrylate). The photochromic dye mixture is composed of:

12 mg of 5-acetoxy-3,3-diphenyl-3H-naphtho(2,1-b)pyrane WO 92/09593

35 mg of 8-methoxy-3,3-diphenyl-3H-naphtho(2,1-b) pyrane U.S. Pat. No. 5,238,981

28 mg of spiro(5-methoxy-1,3,3-trimethylindoline)-2,3'-3H-9'-methoxy-naphth(2,1-b) oxazin DE 2.936.255

6 mg of spiro(1,3,3-trimethylindoline)-2,3'-3H-9'-methoxy-6'-(pyrrolid-1-yl)-naphth(2,1-b)oxazin EU 84 115 602

8 mg of spiro(1,3,3-trimethylindoline)-2,3'-3H-5'-(5-methyloxadiazo-2-yl-naphth(2,1-b)oxazin DE 3.814.631

2 mg of 2,2-diphenyl-2H-naphtho(1,2-b)pyrane U.S. Pat. No. 3,627,690

18 mg of spiroadamantanfulgid (according to example one of EU 0351.112

After adding 1.5 g of the initiator (tertiary butyl perneodecanoate), stirring continues for another 15 minutes at 20° C. Ambient oxygen is removed from the mixture by means of thrice evacuation for ten minutes and equalization of the pressure using argon. The mixture is then filled into the casting molds for the plane face lenses, still under protection from light, respectively under red light.

Polymerization of the photochromic plastic lenses occurs in the casting molds. The latter are placed in a water bath which runs through the following temperature programm. The temperature increase per stage occurs in about 20 minutes, this time is already added to the higher temperature.

20 h 20° C.=>2 h 30° C.=>2 h 40° C.=>6 h 50° C.=>4 h 60° C.=>3 h 70° C.=>3 h 75° C.=>4 h 80° C.

The filled molds are cooled within 1 hour to about 60° C. The lenses are removed from the ring and casting mold shells and tempered another 50 minutes at 115° C. in order to eliminate tensions caused by the casting molds and to completely harden the lens. The casting molds should be made of special glass which is impermeable to UV light up to at least 390 nm. If previous protection from light was consistent, simply blackened molds will suffice. In serial production, it is easier to use conventional white casting molds instead of protection from light during preparation. In this case, the entire lightening of the casting resin mixture occurs by means of irradiation into the water bath. Especially suited proved to be the light from an xenon high-pressure lamp, from which all portions having wavelengths <400 nm had been removed using a conventional polycarbonate disk.

The yielded plane face lenses are excellently suited for ophthalmic lenses. Their V$\lambda$ evaluated transmission according to the spectral light sensitivity of the human eye is 89%, the lenses look practically colorless. After excitation of 15 minutes with 50 klux at 23° C. according to DIN 58 217, the transmission is only 23% yielding a cosmetically very attractive, warm gray-brown tone.

What is claimed is:

1. A process for the production of a photochromic object, composed of a polymer and containing at least one spirooxazin compound, comprising:

mixing a polymerizable monomer selected from the group consisting of an acrylate monomers a methacrylate monomer, and a mixture of a multiple thereof, with photochromic dyes as well as a polymerization initiator to obtain a photopolymerizable mixture, and placing the photopolymerizable mixture yielded thereby in a casting mold, to polymerize and harden said mixture, wherein, in order to obtain a neutral gray, neutral brown or green photochromic tint of said polymerizable mixture, several photochromic dyes are added of which at least one is not a spirooxazin, and the concentration of the spirooxazin compound(s) amounts to no more than 0.045 weight percent relative to the mass of the utilized monomer, and an amount of said polymerization initiator(s) is at least 1.5 weight percent relative to the mass of the utilized monomer.

2. A process according to claim 1, wherein the other photochromic dye is a pyran.

3. A process according to claim 1 or 2, wherein said concentration of said utilized polymerization initiators amounting up to 5 weight percent.

4. A process according to claim 1 or 2, wherein said concentration of said utilized polymerization initiator(s) amounting to between 1.5 and 2 weight percent.

5. A process according to claim 1 or 2, wherein the polymerization being carried out during a period of up to 2 days.

6. A process according to claim 1 or 2, wherein said polymerization being carried out according to a temperature program in the last stage of which the temperature amounts to more than 110° C.

7. A process according to claim 1 or 2, wherein said mixture of monomer(s), photochromic dye(s) and polymerization initiator(s) being degased prior to polymerization.

8. A process according to claim 1 or 2, wherein casting molds made of a material which is impermeable to the excitation wavelengths of the utilized photochromic dyes being employed.

9. A process according to claim 1 or 2, wherein said mixture of monomer(s), photochromic dye(s) and polymerization initiator(s) being prepared under the influence of long-wave, visible light so that possible open, colored states of photochromic molecules are conveyed into the closed colorless states.

10. A process according to claim 9, wherein irradiation of long-wave, visible light being maintained during the polymerization period.

11. A process according to claim 1 or 2, wherein as said monomer 2,2'-bis to (4-(methacryloxy-ethoxy)phenyl)propane
2,2'-bis (4-(methacryloxy-diethoxy) phenyl) propane
trimethylol propane trimethacrylate
ethylene glycol dimethacrylate
diethylene glycol dimethacrylate
triethylene glycol dimethacrylate
benzyl methacrylate
4-tertiary butyl cyclohexanol methacrylate
neopentyl glycol dimethacrylate or a mixture thereof as well as a mixture of said monomers with other acrylates being utilized.

12. A process for the production of photochromic object, composed of a polymer and containing at least one spirooxazin compound, comprising:

mixing a polymerizable monomer selected from the group consisting of an acrylate monomer, a methacrylate monomer, and a mixture of a multiple thereof, with photochromic dyes as well as a polymerization initiator to obtain a photopolymerizable mixture, and placing the photopolymerizable mixture yielded thereby in a casting mold, to polymerize and harden said mixture, wherein, in order to obtain a neutral gray, neutral brown or green photochromic tint of said polymerizable mixture, several photochromic dyes are added, of which at least one is not a spirooxazin, and the concentration of the spirooxazin compound(s) amounts to no more than 0.045 weight percent relative to the mass of the utilized monomer, and an amount of said polymerization initiator(s) is more than 1 weight percent relative to the mass of the utilized monomer, and wherein phosphor compounds are added in order to shorten the lightening period of said mixture of monomer(s), photochromic dye(s) and polymerization initiator(s).

13. A process according to claim 2, wherein the other photochromic dye being spiropyran.

14. A process according to claim 9, wherein said long-wave, visible light being light in the yellow to red spectral range.

15. A photochromic object produced by the process according to claim 1 or 2.

16. A process for the production of photochromic object, composed of a polymer and containing at least one spirooxazin compound, comprising:

mixing a polymerizable monomer selected from the group consisting of an acrylate monomer, a methacrylate monomer, and a mixture of a multiple thereof, with photochromic dyes as well as a polymerization initiator to obtain a photopolymerizable mixture, and placing the photopolymerizable mixture yielded thereby in a casting mold, to polymerize and harden said mixture, wherein, in order to obtain a neutral gray, neutral brown or green photochromic tint of said polymerizable mixture, several photochromic dyes are added, of which at least one is not a spirooxazin, and the concentration of the spirooxazin compound(s) amounts to no more than 0.045 weight percent relative to the mass of the utilized monomer, and an amount of said polymerization initiator(s) is more than 1 weight percent relative to the mass of the utilized monomer, wherein the other photochromic dye is a pyran, and wherein phosphor compounds are added in order to shorten the lightening period of said mixture of monomer(s), photochromic dye(s) and polymerization initiator(s).

17. The process according to claim 16 wherein the pyran is a selected from the group consisting of a spiropyran, an indolizin, a fulgimide, and mixtures thereof.

18. The process according to claim 2, wherein the pyran is a selected from the group consisting of a spiropyran, an indolizin, a fulgimide, and mixtures thereof.

19. A process for the production of a photochromic object, composed of a polymer and containing at least one spirooxazin compound, comprising:

mixing a polymerizable monomer selected from the group consisting of an acrylate monomer, a methacrylate monomer, and a mixture of a multiple thereof, with photochromic dyes as well as a polymerization initiator to obtain a photopolymerizable mixture, and placing the photopolymerizable mixture yielded thereby in a casting mold, to polymerize and harden said mixture, in order to obtain a neutral gray photochromic tint of said polymerizable mixture, several photochromic dyes are added of which at least one is not a spirooxazin, and the concentration of the spirooxazin compound(s) amounts to no more than 0.045 weight percent relative to the mass of the utilized monomer, and an amount of said polymerization initiator(s) is at least 1.5 weight percent relative to the mass of the utilized monomer.

20. A process for the production of a photochromic object, composed of a polymer and containing at least one spirooxazin compound, comprising:

mixing a polymerizable monomer selected from the group consisting of an acrylate monomer, a methacrylate monomer, and a mixture of a multiple thereof, with photochromic dyes as well as a polymerization initiator to obtain a photopolymerizable mixture, and placing the photopolymerizable mixture yielded thereby in a casting mold, to polymerize and harden said mixture, in order to obtain a neutral brown photochromic tint of said polymerizable mixture, several photochromic dyes are added of which at least one is not a spirooxazin, and the concentration of the spirooxazin compound(s) amounts to no more than 0.045 weight percent relative to the mass of the utilized monomer, and an amount of said polymerization initiator(s) is at least 1.5 weight percent relative to the mass of the utilized monomer.

21. A process for the production of a photochromic object, composed of a polymer and containing at least one spirooxazin compound, comprising:

mixing a polymerizable monomer selected from the group consisting of an acrylate monomer, a methacrylate monomer, and a mixture of a multiple thereof, with photochromic dyes as well as a polymerization initiator to obtain a photopolymerizable mixture, and placing the photopolymerizable mixture yielded thereby in a casting mold, to polymerize and harden said mixture, in order to obtain a green photochromic tint of said polymerizable mixture, several photochromic dyes are added of which at least one is not a spirooxazin, and the concentration of the spirooxazin compound(s) amounts to no more than 0.045 weight percent relative to the mass of the utilized monomer, and an amount of said polymerization initiator(s) is more than 1 weight percent relative to the mass of the utilized monomer.

* * * * *